Patented Nov. 8, 1938

2,136,270

UNITED STATES PATENT OFFICE 2,136,270

MANUFACTURE OF PLASTIC MASSES

Nicholas Bennett, Widnes, England, assignor to Imperial Chemical Industries Limited, a corporation of Great Britain No Drawing. Application July 14, 1937, Serial No. 153,675. In Great Britain July 22, 1936

1 Claim. (Cl. 106—23)

This invention relates to the manufacture of novel compositions of matter, and in particular to the manufacture of compositions containing chlorinated rubber.

Many proposals have been made to prepare plastic masses by incorporating with chlorinated rubber such materials as natural and artificial resins, alkylated naphthalenes, rubber, vegetable oils and the like, the products having varying ranges of plasticity, colour, etc., and being applicable to a variety of purposes.

According to the present invention, substantially non-inflammable compositions are prepared by incorporating chlorinated rubber with one or more of such condensation products as are obtained by reacting in the presence of a Friedel-Crafts catalyst such as aluminium chloride, or similar anhydrous metallic chloride, an aromatic hydrocarbon containing nuclearly substituted halogen with a hydrocarbon containing halogenated aliphatic carbon atoms. This halogenated hydrocarbon, which contains at least one halogen atom attached to an acyclic carbon atom, may be a halogenated aliphatic hydrocarbon, such as ethylene dichloride, or it may be an aromatic hydrocarbon with a halogenated side chain. In this latter instance one or more of the carbon atoms of the aromatic nucleus may or may not be halogenated. The halogenated derivatives of these condensation products can also be used in the practice of my invention.

I find that in many cases such compositions have a higher softening point and a greater transparency than similar ones prepared, for example, from chlorinated rubber and methyl naphthalene. I also find that compositions with a relatively high chlorinated rubber content can be prepared which are still tacky, and are thus useful where a comparatively firm yet adhesive non-inflammable mass is required.

Examples of the halogenated derivatives of the aromatic hydrocarbons which may be used are mono-chlorbenzene, ortho-dichlorobenzene, chloro-toluenes, mono- and trichloronaphthalene, bromo-benzenes and bromo-naphthalenes, and suitable hydrocarbon derivatives containing halogenated aliphatic groupings include trichloroethylene, ethylene dichloride, methylene chloride, ethylene dibromide, a propylene dichloride, benzyl chloride or chlorinated paraffin wax. Excellent compositions have been prepared using condensation products in the manufacture of which I have used aliphatic groupings containing at least two carbon atoms to which a halogen is attached.

The condensation process may be carried out in the normal manner for conducting a Friedel-Crafts reaction, e. g. the two reactants may be mixed and the catalyst added gradually as evolution of gas proceeds, using heat if necessary either to complete or accelerate the reaction. Alternatively, the catalyst may be mixed with one of the reactants and the second reactant gradually added to the mixture. Inert diluents may also be added to facilitate the condensation. The condensation products may then, after removal of the catalyst, be used directly for incorporation with the chlorinated rubber, but preferably they are purified, e. g. by removing any uncondensed materials by fractional distillation, steam distillation or by a stream of inert gas. Frequently the product itself can also be distilled in vacuo or in a molecular still, and if desired, fractions of different boiling point may be isolated, and many of them used as plasticizers for the chlorinated rubber. In another variation which is possible when an excess of a liquid reactant has been present in the condensation, or when an inert diluent has been used, the incorporation of the clorinated rubber may be performed before such diluent or excess reactant is evaporated off.

Considerable variations in the physical characteristics of the plastic mass, e. g. softening points, colour, transparency can be achieved not only by altering the proportion of the chlorinated rubber to condensation products, but also by altering the aromatic and aliphatic derivatives subjected to condensation. Thus, for example, monochlorobenzene condensed with ethylene dichloride in the presence of aluminum chloride yields a high boiling non-inflammable liquid which when incorporated with chlorinated rubber in the ratio 3:2 yields a brown, translucent, soft non-inflammable solid. The condensation product of dichlorbenzene with ethylene dichloride is a solid which with chlorinated rubber gives products which have a higher softening point than the corresponding monochlorbenzene products, and are opaque cream coloured solids having only a slight elasticity. The incorporation of chlorinated rubber with the product obtained by condensing chlorinated benzenes or chlorinated naphthalenes with chlorinated aliphatic hydrocarbons such as trichlorethylene, are much more rigid at ordinary temperatures, and only acquire markedly plastic properties at elevated temperature. Thus the condensation product from monochloronaphthalene and ethylene dichloride is itself solid at ordinary temperatures, and gives hard, brittle masses when incorporated with chlorinated rubber.

On the other hand, plastics made from chlorinated rubber and the condensation products of chloro-aromatics with long chain chloro-aliphatics are softer and more sticky.

The incorporation of the components of the plastic mass may be brought about in any convenient manner. In the case of the softer condensation products, milling with the chlorinated rubber in a machine of the type usually employed for preparing plastic solids, e. g. a Werner Pfleiderer or Baker-Perkins mixer, and the range of products which can be so treated can, of course, be extended by varying the temperature of the mixer. Nevertheless, with the condensation products of comparatively high softening point, a more convenient method is to dissolve the chlorinated rubber and the condensation product in a common volatile solvent such as benzene, toluene or trichlorethylene, and then to remove the solvent by evaporation. Mixtures of the condensation products may also be used, and fillers, e. g. wood meal, asbestos fibre, and pigments may be incorporated with the mass, as well as known plasticizing agents such as tricresyl phosphate, or dibutyl phthalate.

The valuable non-inflammable properties of the compositions of my invention are largely due to their high chlorine content, and thus, according to one form of my invention I may enhance the fireproof nature of my compositions by halogenating, e. g. chlorinating, the condensation product before incorporating it with the chlorinated rubber. This chlorination may conveniently be effected by heating the condensation product until it is fluid, and then passing in chlorine gas, preferably in the dark, and if desired in the presence of a halogen carrier such as iodine, anhydrous ferric chloride or antimony trichloride. Alternatively it may be carried out in the presence of a solvent such as carbon tetrachloride. The crude condensation product may also be purified before subjecting it to chlorination.

The following examples illustrate methods of preparing the condensation products and incorporating it with the chlorinated rubber according to my invention, all parts being by weight.

Example 1

179 parts of orthodichlorbenzene and 12 parts of anhydrous aluminium chloride were heated on a water bath at about 80° C., and 40 parts of ethylene dichloride slowly added, the mixture being constantly agitated. When hydrogen chloride ceased to be evolved the product was poured into water and washed with hydrochloric acid and water. Excess dichlorbenzene was then removed by steam distillation, the product dried in an oven at 80° C., and then distilled in the presence of lime under a pressure of 4–10 mms. A plastic mass, pliable at ordinary temperatures, was then made by incorporating 60 parts of this product with 40 parts of chlorinated rubber in a Werner-Pfleiderer mixer at 80–90° C. for 2 to 3 hours.

Example 2

1170 parts of monochlornaphthalene were heated with constant agitation to 90° C. 234 parts of ethylene dichloride slowly added and also 80 parts of anhydrous aluminium chloride and the temperature gradually raised to 140° C. Excess monochlornaphthalene was then distilled off, the residue neutralized by addition of lime, extracted with trichlorethylene, the solution filtered and the solvent removed from the filtrate by evaporation.

An opaque mass, brittle at ordinary temperatures, was made by mixing 85 parts of the product so formed with 15 parts of chlorinated rubber in a Werner Pfleiderer mixer at 80–90° C. for 2–3 hours.

Example 3

800 parts of chlorinated naphthalene (49% chlorine) were dissolved in 500 parts of methylene chloride, the solution warmed to 40° C. and 45 parts of anhydrous aluminium chloride slowly added while the mass was constantly agitated. When evolution of gas ceased, the catalyst was decomposed by addition of water, the solution neutralized with lime and distilled leaving a wax-like residue.

A plastic mass was obtained by incorporating 3 parts of this residue with 2 parts of chlorinated rubber in a Werner Pfleiderer mixer.

Example 4

560 parts of orthodichlorbenzene and 33 parts of anhydrous aluminium chloride were heated on a water bath at about 80° C. and 110 parts ethylene dichloride slowly added, the mixture being constantly agitated. When hydrogen chloride ceased to be evolved the product was poured into water and washed with hydrochloric acid and water. 60 parts of this product were then incorporated with 40 parts of chlorinated rubber in a Werner Pfleiderer mixer, when a brown translucent mass was obtained which at ordinary temperatures was sticky and slightly elastic.

Example 5

300 parts of the condensation product obtained from the condensation of monochlorbenzene and ethylene dichloride were purified, and heated to 50° C. with one part of anhydrous ferric chloride and 600 parts of chlorine slowly passed in. The product was heated at 160° C. for 6 hours with lime and then distilled at a pressure of 7 mms. of mercury. The distillate came over at 220–230° C. and was a soft yellow solid containing 44.3% (nuclear) chlorine. A plastic composition was made by mixing together equal parts by weight of the above condensation product and chlorinated rubber. A transparent, elastic, slightly sticky product was obtained.

Example 6

340 parts of monochlorobenzene were mixed with 100 parts of anhydrous aluminium chloride and the temperature raised to 80–100° C. 132 parts of trichlorethylene were added to the mixture with constant agitation. The product was washed with water to remove excess aluminium chloride, neutralized with alkali, filtered and the solvent removed by distillation. The product was resinous in character and by dissolving in benzene together with chlorinated rubber gave a solution which after evaporating the solvent left a mass which was brittle at atmospheric temperatures but plastic at elevated temperatures.

Example 7

750 parts chlorinated paraffin wax (chlorine content 22%) were added gradually to a mixture of 1660 parts of monochlorobenzene and 75 parts aluminium chloride at a temperature of 130° C. with vigorous agitation. The temperature was maintained for 4 hours after addition was complete. The catalyst was decomposed by adding water and the excess monochlorobenzene distilled off. The product was filtered through soda ash, a highly fluorescent oil being obtained. Equal parts of this product were incorporated with chlorinated rubber to give a tough semi-translucent plastic.

As many apparently widely different embodiments of this invention may be made without departing from the spirit and scope thereof, it is to be understood that I do not limit myself to the specific embodiments thereof except as defined in the appended claim.

I claim:

A composition of matter comprising chlorinated rubber and the product obtained by reacting in the presence of a Friedel-Craft catalyst an aromatic hydrocarbon having at least one halogen atom attached to a nuclear carbon atom with a hydrocarbon having at least one halogen atom attached to an acyclic carbon atom.

NICHOLAS BENNETT.